(No Model.)
J. R. WILLEY.
COMBINED HARROW AND ROLLER.
No. 537,373. Patented Apr. 9, 1895.
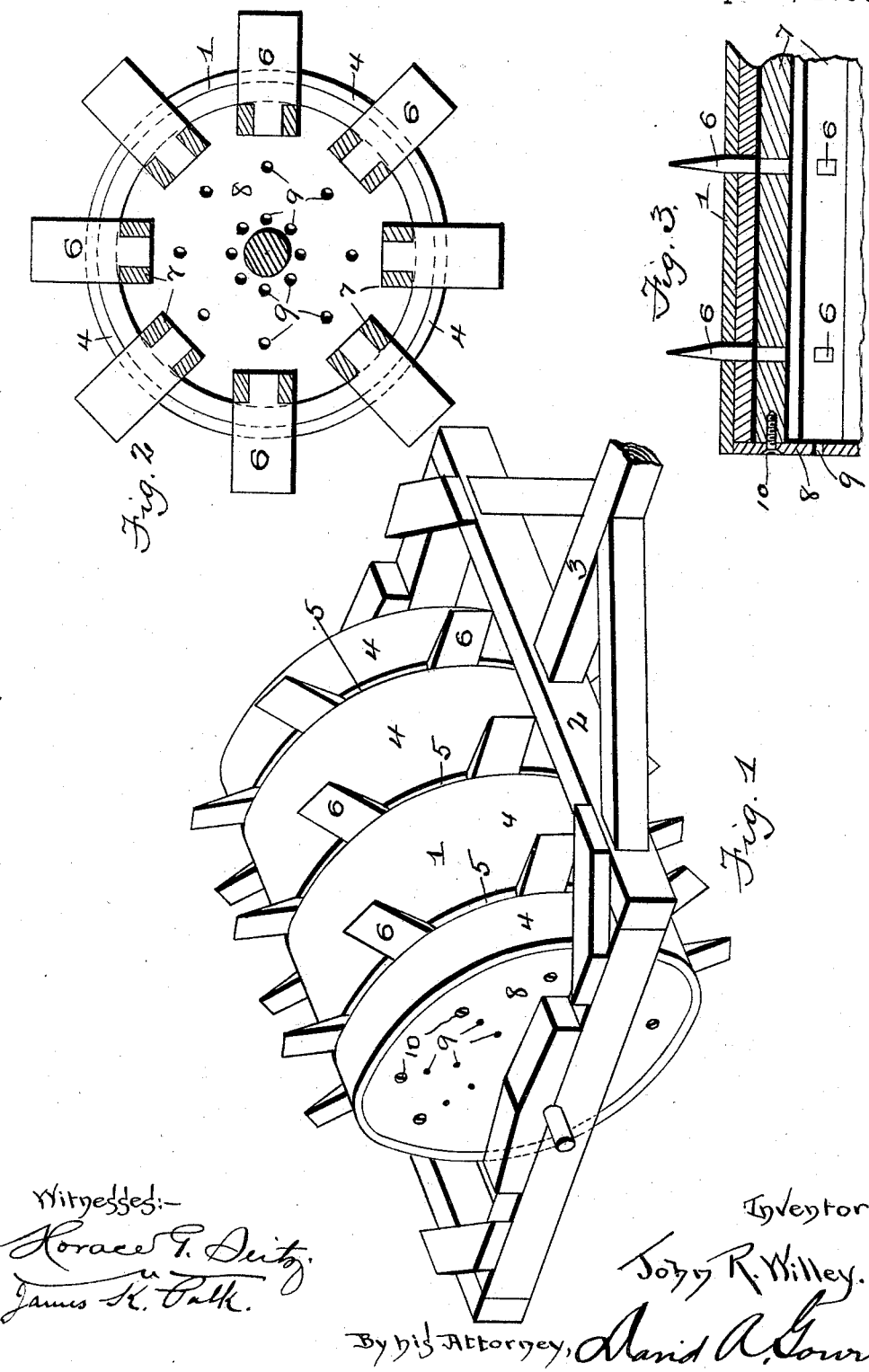
Witnesses:—
Horace T. Deitz
James K. Polk
Inventor:—
John R. Willey.
By his Attorney, David A. Gowrick

UNITED STATES PATENT OFFICE.

JOHN R. WILLEY, OF PETERSBURG, INDIANA.

COMBINED HARROW AND ROLLER.

SPECIFICATION forming part of Letters Patent No. 537,373, dated April 9, 1895.

Application filed April 18, 1894. Serial No. 508,020. (No model.)

*To all whom it may concern:*

Be it known that I, JOHN R. WILLEY, a citizen of the United States, residing at Petersburg, in the county of Pike and State of Indiana, have invented a new and useful Improvement in a Combined Harrow and Roller, of which the following is a specification.

My invention relates to combined harrows and rollers, and has for its object to provide a machine that can be quickly and easily converted either into a harrow or clod crusher or into a roller as may be desired. This object I accomplish in the manner and by the means hereinafter described and claimed, reference being had to the accompanying drawings, in which—

Figure 1 is a perspective view of my improved device. Fig. 2 is a vertical section taken through the cylinder.

Similar figures of reference indicate corresponding parts in the drawings.

In the said drawings the numeral 1 indicates the usual cylinder or roller suitably journaled in a frame 2 to which is fastened the tongue 3 for attaching the draft animals. The said cylinder or roller 1 is formed on its outer surface of a series of metal plates 4 bent to the proper curved contour, and leaving their edges a distance apart to provide the slots 5 as shown. Through the said slots 5 are adapted to project the teeth 6, preferably of the wedge shape shown in the drawings. These teeth are mounted in series upon a series of bars 7 running longitudinally of the roller. The end pieces 8 of the roller are provided with the radially diverging holes 9 as shown, through which are adapted to be passed the screws 10, which enter the ends of the bars 7 or projections thereon to receive said screws, and retain them and the teeth carried thereby in place.

It will be obvious that by providing the holes at different distances from the roller bearings, the bars 7 and the teeth 6 may be adjusted so that the latter will project their full length through the slots 5, so as to provide an efficient harrow or clod crusher, or, when desired, by removing the screws 10 and inserting them through the holes nearest the roller bearings and into the bars 7, the teeth will be withdrawn into the roller or cylinder leaving a smooth unbroken surface adapted to act as an efficient roller.

If desired the curved surface of the roller may be provided with a series of independent slots through which the teeth project, instead of the continuous slots shown. So also in place of the holes 9, diverging slots may be used through which the ends of the bars 7 will project carrying nuts adapted to engage the exterior surface of the end pieces 8 and thus retain the teeth in any predetermined position.

Having thus described my invention, what I claim as new, and desire to secure by Letters Patent, is—

1. In combination with the frame 2, the cylinder 1 having the peripheral slots 5, the bars 7 carrying the teeth 6 and adjustable by the screws 10 in the holes 9 in the end pieces 8, substantially as and for the purpose shown and described.

2. A combined harrow and roller comprising the roller or cylinder 1 having the peripheral slots 5 and the end pieces 8 with holes 9 therein; the bars 7 carrying the teeth 6 and the screws 10 adapted to removably engage the bars 7 through the holes 9 in the end pieces, substantially as shown and described.

3. In a combined harrow and roller, the combination with the cylinder having peripheral slots therein, of a series of harrow teeth rigidly secured to bars adjustably fastened at their ends to the ends of the cylinder with reference to the surface of the cylinder, substantially as shown and described.

JOHN R. WILLEY.

Witnesses:
GEO. D. MARTIN,
JAMES D. FINCH.